US009913179B2

(12) United States Patent
Kompalli Chakravartula et al.

(10) Patent No.: US 9,913,179 B2
(45) Date of Patent: Mar. 6, 2018

(54) METHOD AND SYSTEM TO TRIGGER UE HANDOVER IN A RADIO COMMUNICATION NETWORK

(71) Applicant: Centre of Excellence in Wireless Technology, Chennai (IN)

(72) Inventors: Kalyana Rama Sesha Sayee Kompalli Chakravartula, Chennai (IN); Nadeem Akhtar, Chennai (IN); Siva Kishore Reddy Yerrapareddy, Kadapa (IN); Sunil Kaimalettu, Chennai (IN); Venkatarao Gonuguntla, Chennai (IN)

(73) Assignee: CENTRE OF EXCELLENCE IN WIRELESS TECHNOLOGY, Chennai (IN)

( * ) Notice: Subject to any disclaimer, the term of this patent is extended or adjusted under 35 U.S.C. 154(b) by 52 days.

(21) Appl. No.: 14/322,511

(22) Filed: Jul. 2, 2014

(65) Prior Publication Data
US 2015/0011224 A1 Jan. 8, 2015

(30) Foreign Application Priority Data
Jul. 3, 2013 (IN) .......................... 2972/CHE/2013

(51) Int. Cl.
*H04W 36/30* (2009.01)
*H04W 36/00* (2009.01)

(52) U.S. Cl.
CPC ........ *H04W 36/0083* (2013.01); *H04W 36/30* (2013.01)

(58) Field of Classification Search
CPC ...... H04W 36/32; H04W 36/00; H04W 36/30

USPC ....... 455/435, 437, 438, 439, 440, 441, 442, 455/443, 444; 370/331, 332, 333
See application file for complete search history.

(56) References Cited

U.S. PATENT DOCUMENTS

| | | | | |
|---|---|---|---|---|
| 2010/0118844 | A1* | 5/2010 | Jiao | H04W 24/02 370/338 |
| 2011/0250892 | A1* | 10/2011 | Gupta | H04W 36/0011 455/437 |
| 2011/0306347 | A1* | 12/2011 | Choi | H04W 36/04 455/438 |
| 2012/0064886 | A1* | 3/2012 | Kim | H04W 24/04 455/423 |
| 2012/0190374 | A1* | 7/2012 | Jo | H04W 72/085 455/450 |
| 2013/0208587 | A1* | 8/2013 | Bala | H04W 16/14 370/230 |

(Continued)

*Primary Examiner* — Kamran Afshar
*Assistant Examiner* — Nicole Louis-Fils

(57) ABSTRACT

The embodiments herein provide a method and system to trigger UE handover in a radio communication network including a serving base station and a plurality of candidate base stations. The serving base station shares uplink transmission information associated with the UE with the candidate base stations. A candidate base station detects the presence of the UE located in radio coverage of the candidate base station by obtaining information from the uplink transmission of the UE. Further, the candidate base station computes a second parameter and sends to the serving base station. The serving base station determines to trigger handover procedure when the second parameter meets handover criteria. Further, the serving base station sends handover command to the UE after determining that the second parameter meets handover criteria.

20 Claims, 5 Drawing Sheets

(56) References Cited

U.S. PATENT DOCUMENTS

2016/0165496 A1* 6/2016 Amirijoo .......... H04W 36/0083
　　　　　　　　　　　　　　　　　　　　　　455/437

* cited by examiner

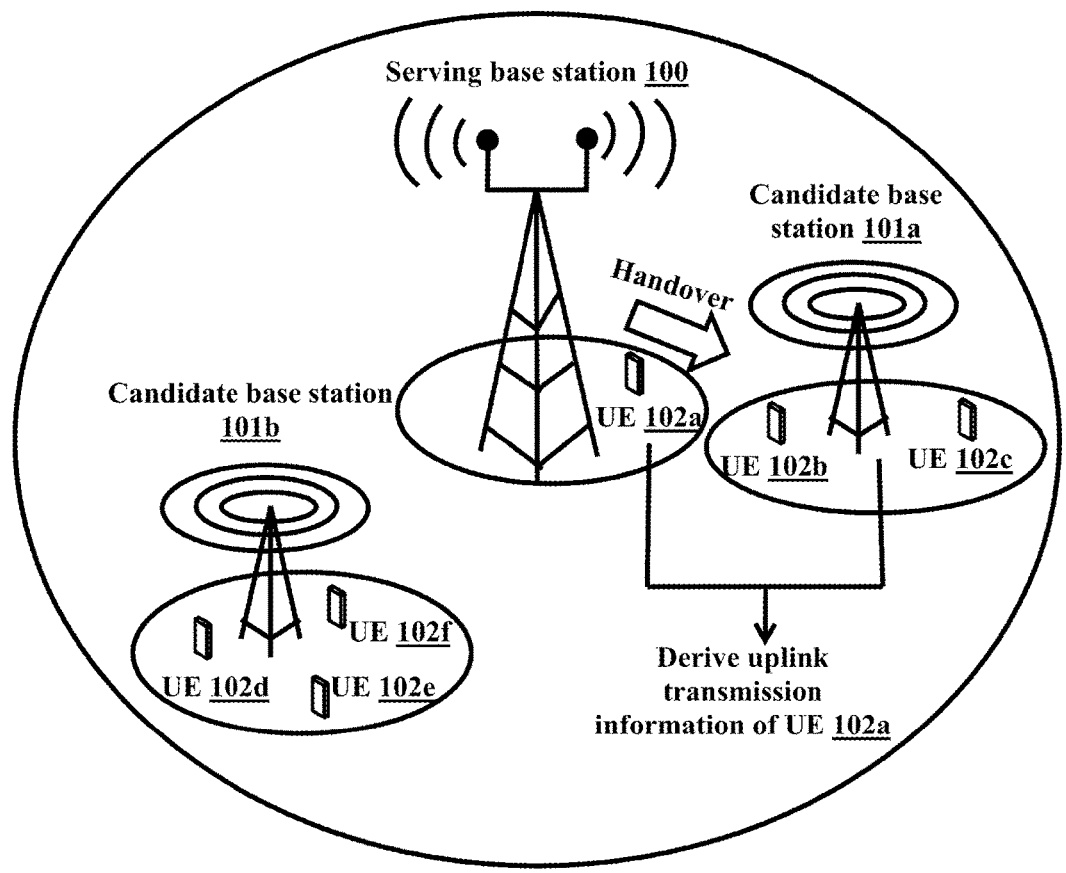
FIG: 1

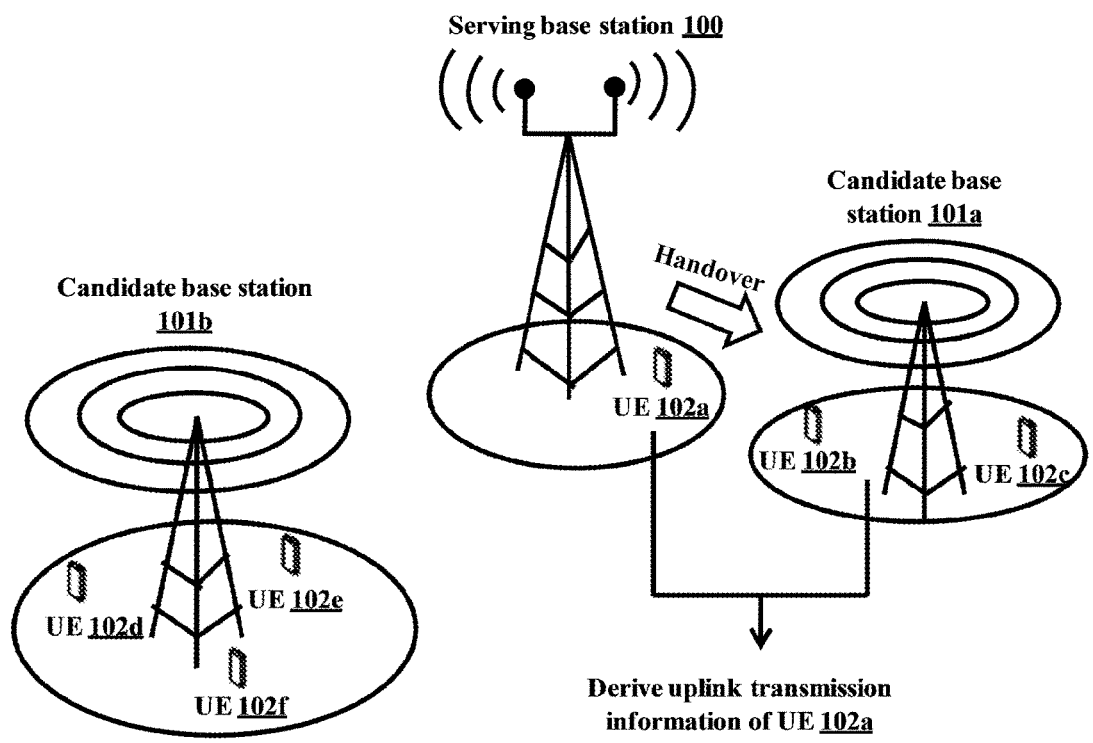

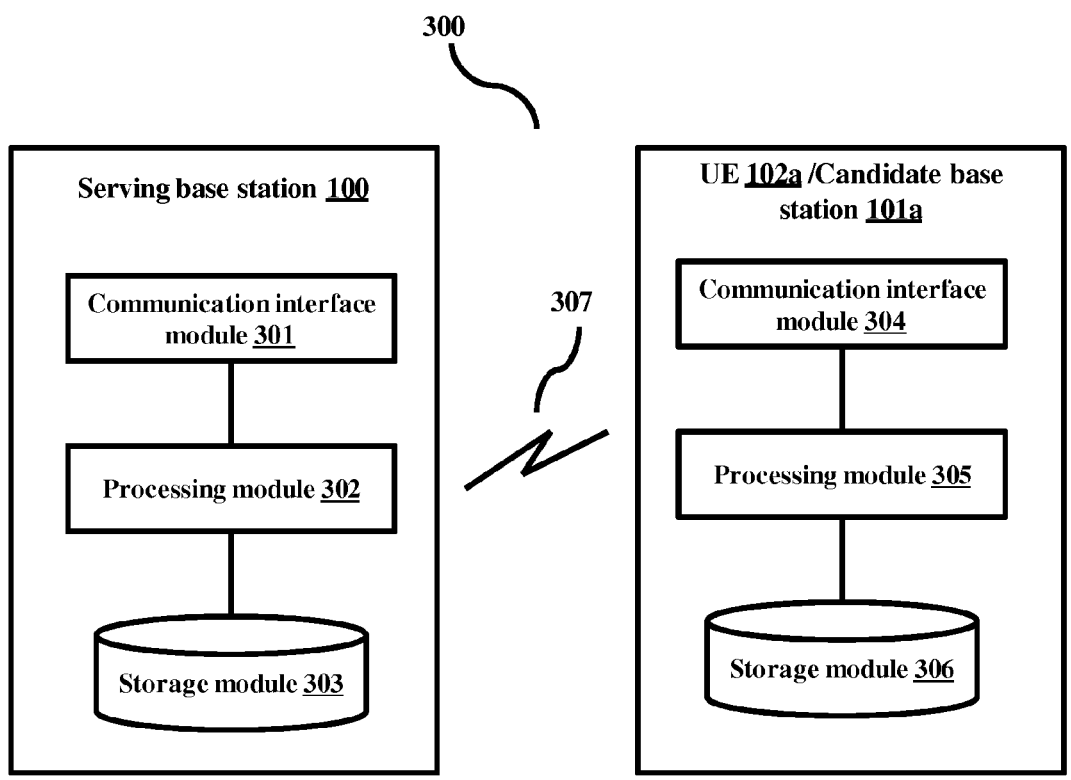
FIG: 3

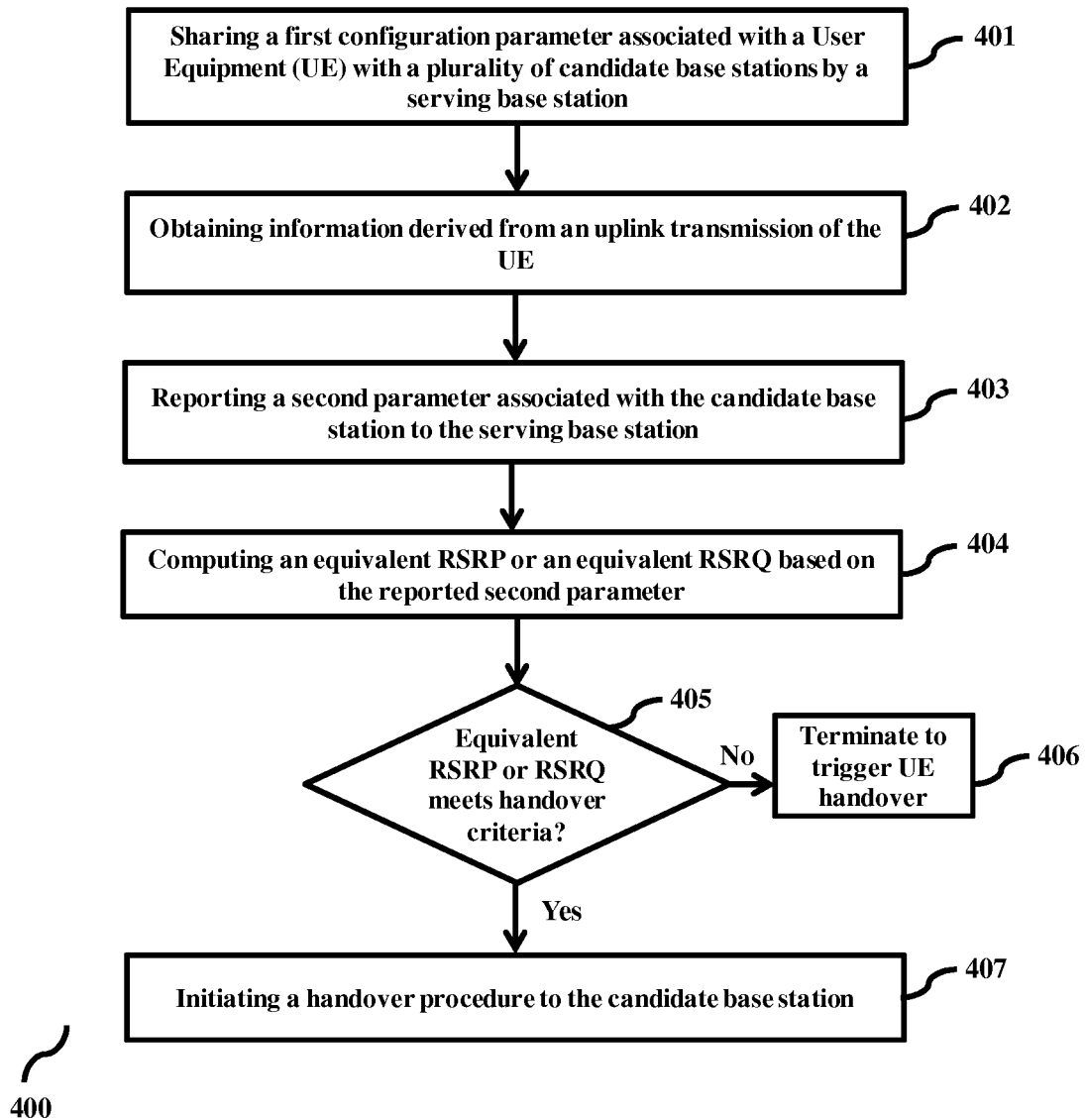
FIG: 4

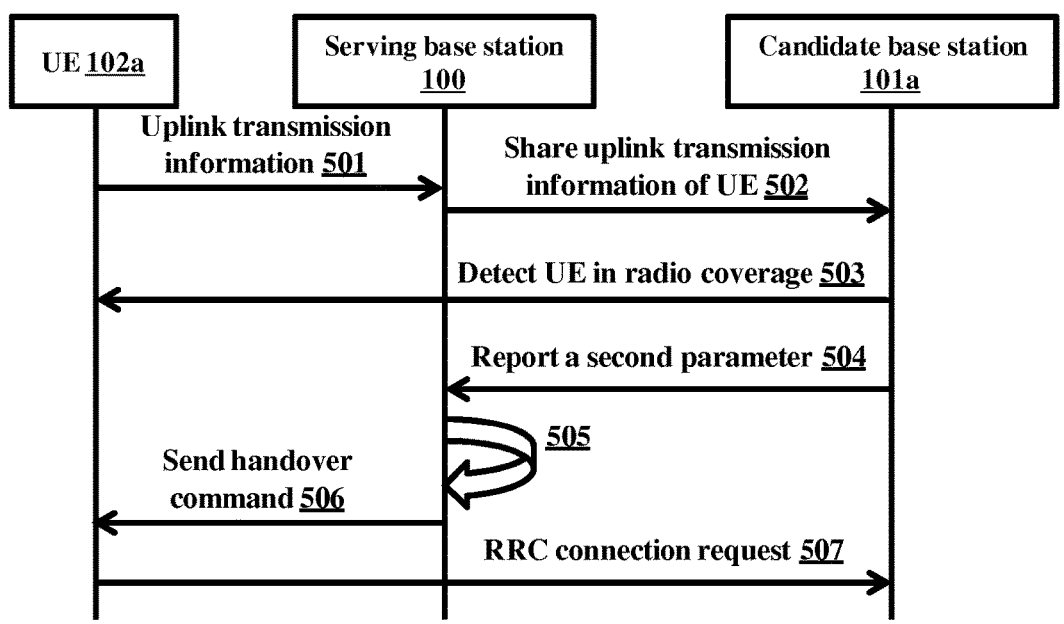
FIG: 5

METHOD AND SYSTEM TO TRIGGER UE HANDOVER IN A RADIO COMMUNICATION NETWORK

The present application is based on, and claims priority from, IN Application Number 2972/CHE/2013, filed on 3 Jul. 2013, the disclosure of which is hereby Incorporated by reference herein.

FIELD OF EMBODIMENT

The present Embodiment relates to a method of handover in a radio communication network, and more particularly, a method of handover includes detection of User Equipment (UE's) proximity by listening to its uplink control channel and/or date transmissions.

BACKGROUND OF EMBODIMENT

Demand for wireless services is increasingly rapidly as evident by the tremendous growth in recent years in smart phones. This explosive growth in data traffic and its bandwidth requirements have already saturated the current generation of radio communication networks and will continue to pose a major bandwidth challenge for 3rd Generation Partnership Project (3GPP) systems such as Long-Term Evolution (LTE), Universal Mobile Telecommunications System (UMTS) and High Speed Packet Access (HSPA) and so on.

One of the major challenges faced by operators with the advent of smart phones, tablets and so on is to meet the increased demand for high-speed data services. In order to boost the network capacity, operators are deploying Heterogeneous Networks (HetNets) which are made up of two layers of base stations: a macro-layer consisting of base stations which transmit at high power (e.g., 46 dBm) to provide global coverage and a small-cell layer which consists of pico/femto/relay base stations that transmit at lower power (e.g., 23 dBm) to provide capacity and solve coverage-hole problems. In typical HetNet deployments, several small-cells may be deployed within the coverage area of a macro-cell.

In many countries, spectrum in the higher frequency bands like 3.5 GHz is being freed-up for cellular usage. The relatively poor propagation characteristics associated with carriers in the higher frequency bands make them more suitable for small-cell deployments than macro-cell deployments. In contrast, carriers in the lower frequency bands like 700 MHz, owing to their good indoor as well as outdoor propagation characteristics, are considered more attractive for macro-cell deployments. Thus, the operator deployed HetNet may have the macro layer deployed with one or more carriers in the lower end of the spectrum and the small-cell layer deployed on carriers in the higher end of the spectrum. Depending on the operating load and availability of spectrum, operators may assign either only one carrier at any time to macro and small cell layers or multiple carriers simultaneously to support dual connectivity for increased data rates as well as to ensure robust mobility.

In case of homogenous network, a serving base station may handover the UE to its neighboring base station for load balancing. In above mentioned scenario, the UEs will be required to perform radio measurements more frequently than when the small-cell layer is not present. Frequent measurements by UE will drain the battery more quickly. In addition, it will reduce throughput of UEs supporting only one RF chain because measurements on non-serving carrier decreases the scheduling opportunities on the serving carrier. To trigger inter-frequency handover at a UE in LTE network, the serving base station executes a process that includes configuring a list of neighbor base station on which the UE will be asked to measure Reference Signal Received Power (RSRP) and/or Reference Signal Received Quality (RSRQ) on cell-specific reference signals, a metric for the received radio signal strength. Configuring appropriate measurement gaps in time to facilitate RSRP/RSRQ measurements on one or more target cells by the UE, and instructing the UE to perform the configured radio measurements on the BS included in the list.

After performing the measurements, the UE sends measurement reports to its serving base station as per the reporting configuration, based on which, the serving base station decides whether the UE should be handed over to one of the target BS reported by the UE. When the UE becomes a candidate for handover and the target BS is ready to accept it, the UE is asked to perform a contention-free Random Access procedure to the target base station to achieve time alignment and obtain an uplink resource grant for subsequent control and data transmissions.

OBJECT OF EMBODIMENT

The principal object of the embodiments herein is to provide a method and system to trigger User Equipment (UE) handover by a serving base station to a candidate base station in a radio communication network by detecting the UE in radio coverage of the candidate base station based on information derived in the uplink transmissions of the UE.

SUMMARY

Accordingly the Embodiment provides a method for triggering a User Equipment (UE) handover in a radio communication network comprising one or more serving base stations and a plurality of candidate base stations. The method includes sharing a first configuration parameter associated with the UE with the plurality of candidate base stations by one or more serving base station. The UE is associated with the serving base station. The method further includes obtaining information derived from an uplink transmission of the UE by a candidate base station from the plurality of candidate base stations to detect whether the UE is within its radio coverage. The information comprises the first configuration parameter. Further, the method includes reporting a second parameter associated with the candidate base station to the serving base station in response to detecting that the UE is within radio coverage of the candidate base station. Furthermore, the method includes determining, at the serving base station, whether the second parameter meets handover criteria to trigger the UE handover to the candidate base station.

Accordingly the Embodiment provides a system for triggering a User Equipment (UE) handover in a radio communication network comprising one or more serving base stations and a plurality of candidate base stations. The system is configured to share a first configuration parameter associated with the UE with the plurality of candidate base stations by one or more serving base stations. The UE is associated with the serving base station. The system is configured to obtain information derived from an uplink transmission of the UE by a candidate base station from the plurality of candidate base stations to detect whether the UE is within its radio coverage. The information comprises the first parameter. Further, the system is configured to report a second parameter associated with the candidate base station to the serving base station in response to detecting that the UE is within radio coverage of the candidate base station. Furthermore, the system is configured to determine, at the serving base station, whether the second parameter meets handover criteria to trigger the UE handover to the candidate base station.

Accordingly the Embodiment provides a serving base station to trigger a User Equipment (UE) handover in a radio communication network including a plurality of candidate base stations. The serving base station is configured to share information related to an uplink transmission of the UE with the plurality of candidate base stations. The UE is served by the serving base station and the information is associated with a first configuration parameter. The serving base station is configured to receive a second parameter associated with a candidate base station after detecting that the UE is within radio coverage of the candidate base station. Further, the serving base station is configured to determine whether the second parameter meets handover criteria to trigger the UE handover to the candidate base station.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This Embodiment is illustrated in the accompanying drawings, throughout which like reference letters indicate corresponding parts in the various figures. The embodiments herein will be better understood from the following description with reference to the drawings, in which:

FIG. 1 illustrates an overview of a heterogeneous network, according to embodiments as disclosed herein;

FIG. 2 illustrates an overview of a homogenous network, according to embodiments as disclosed herein;

FIG. 3 illustrates a block diagram of a serving base station, a User Equipment (UE), and candidate base station, according to embodiments as disclosed herein;

FIG. 4 is a flow diagram explaining a method of triggering a UE handover in a radio communication network; and FIG. 5 is a sequence diagram showing the steps involved in UE handover to a candidate base station, according to embodiments as disclosed herein.

DETAILED DESCRIPTION OF EMBODIMENT

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The term "or" as used herein, refers to a non-exclusive or, unless otherwise indicated. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system to trigger User Equipment (UE) handover by a serving base station to a candidate base station in a radio communication network by detecting the UE in radio coverage of the candidate base station based on information derived in the uplink transmissions of the UE. The method is based on the detection of UE's in radio coverage of a candidate base station by listening to UE's uplink control channel and/or data transmissions.

The method includes triggering a UE handover in a radio communication network. The radio communication network includes one or more serving base stations and a plurality of candidate base stations. The method includes sharing a first configuration parameter associated with the UE with the plurality of candidate base stations by one or more serving base stations. The UE is associated with the serving base station. In an embodiment, the first configuration parameter includes but are not limited to a Sounding Reference Signal (SRS) transmission sequence identifier assigned to the UE by the serving base station, a transmission schedule of the SRS transmission, a periodicity of the SRS transmission, a SRS transmit power of the UE, a Demodulation Reference Signal (DMRS), and a Physical Random Access Channel (PRACH).

In an embodiment, the serving base station select the UE to trigger handover procedure with candidate base station is based on one of radio capabilities of the UE, QoS requirements, reported RSRP for the serving base station, and Geo-location of the UE.

The method includes obtaining information derived from an uplink transmission of the UE by the candidate base station to detect whether the UE is within its radio coverage. The information includes the first configuration parameter. The method includes reporting a second parameter associated with the candidate base station to the serving base station in response to detecting that the UE is within radio coverage of the candidate base station. In an embodiment, the second parameter include but are not limited to a Sounding Reference Signal received power (SRSRP), a Sounding Reference Signal received Quality (SRSRQ), a carrier frequency of the candidate base station and an uplink time-alignment of the UE with respect to the candidate base station.

The method includes determining at the serving base station, whether the second parameter meets handover criteria to trigger the UE handover to the candidate base station.

The proposed method and system provides fast and efficient UE handover to the candidate base station when such UE is in the radio coverage of the candidate base station to achieve load balancing, to support higher data rates, and to achieve mobility robustness by using efficient mechanisms for UE discovery, radio connection establishment, and handoff procedures.

In an embodiment, the radio communication network can be a heterogeneous network (HetNet) or a homogenous network.

In an embodiment, the proposed method and system can be implemented in any radio communication network including but are not limited to a 3GPP systems such as LTE, UMTS, and HSPA and so on.

In case of the candidate base station 101a not serving any UE and does not have UEs in its radio coverage connected to neighbor base station, will save power by switching off Cell Reference Signals (CRS) and other control channel transmissions. This will also reduce control channel and CRS interference to serving base station and other candidate base stations in its vicinity.

The serving base station can trigger handover of the UE to the candidate base station without configuring measurement gaps to enable candidate base station RSRP measurements by the UE. This saves UE's battery power that would otherwise be expended in measuring reference signals from candidate base station in its vicinity and reduces signaling overhead between UE and serving base station. The proposed method and system is beneficial especially when the UE has only one RF chain. This also reduces the time involved in the handover and simplifies mobility-related procedures at the UE. The proposed method and system enables a handover without any UE side measurement. The proposed method and system is applicable to intra-frequency handover and inter-frequency handover.

The proposed method and system does not require UE to perform a Random Access procedure to the candidate base station because the UE receives uplink timing to the candidate base station from the serving base station in a handover command. As a result, the overall delay involved in connecting to the candidate base station is reduced to almost zero since the handover could be started by simple cross-scheduled downlink allocation.

Referring now to the drawings, and more particularly to FIGS. 1 through 5, where similar reference characters denote corresponding features consistently throughout the figures, there are shown preferred embodiments.

FIG. 1 illustrates an overview of a heterogeneous network, according to embodiments as disclosed herein. As depicted in the FIG. 1, the heterogeneous network (HetNet) includes a serving base station 100, a plurality of candidate base stations 101a and 101b respectively. A User Equipment (UE) 102a is currently being served by the serving base station 100 and the UE 102a is within the radio coverage of the serving base station 100. Further, UE's 102b, UE 102c are within the radio coverage of the candidate base station 101a and UE's 102d, UE 102e and UE 102f are within the radio coverage of the candidate base station 101b. As depicted from the FIG. 1, the UE 102a is in connected mode and currently being served by the serving base station 100. In the connected mode, the UE 102a enters the radio coverage of the candidate base station 101a. The serving base station 100 after identifying that the UE 102a is entering the radio coverage of the candidate base station 101a and leaving the radio coverage of the serving base station 100, determines to handover UE 102a to the candidate base station 101a. Further, the serving base station 100 decides to trigger handover of UE 102a to attain load balancing, to support higher data rates, to achieve mobility robustness and so on.

In an embodiment, the serving base station can be a macro base station. In an embodiment, the candidate base stations 101a and 101b deployed in the heterogeneous network can be a pico base station, a femto base station, a relay base station which enables flexible and low cost deployment. The radio coverage of the macro base station is wide and that includes pico base station, femto base station or a relay base station.

Although it is shown in the FIG. 1, that there is only one UE 102a currently served by the serving base station 100, it is to be understood to a person of ordinary skill in the art that any number of UEs are served by the serving base station 100.

The serving base station 100 shares configuration parameters of the UE 102a with the candidate base station 101a. In an embodiment, the configuration parameters includes but are not limited to a Sounding Reference Signal (SRS) transmission sequence identifier assigned to the UE 102a by the serving base station 100, a transmission schedule of the SRS transmission, a periodicity of the SRS transmission, a SRS transmit power of the UE 102a, a Demodulation Reference Signal (DMRS), and a Physical Random Access Channel (PRACH).

In an embodiment, the serving base station 100 select the UE 102a to trigger handover procedure with the candidate base station 101a is based on one of Radio capabilities of the UE 102a, QoS requirements, reported RSRP for the serving base station 100, and Geo-location of the UE 102a.

In an embodiment, the candidate base station 101a obtains information derived from an uplink transmission of the UE 102a to detect whether the UE 102a is within the radio coverage of the candidate base station 101a. The information includes the first configuration parameter shared by the serving base station 100.

In an embodiment, the candidate base station 101a computes a second parameter associated with the candidate base station 101a and reports the second parameter after detecting that the UE 102a is within radio coverage of the candidate base station 101a.

In an embodiment, the candidate base station 101a determines whether the computed second parameter is within a threshold and reports the computed second parameter associated with the candidate base station 101a to the serving base station 100 after determining that the second parameter is within the threshold. This reduces message exchange on an interface between the serving base station 100 and the candidate base station 101a.

In an embodiment, the second parameter includes but is not limited to a Sounding Reference Signal received power (SRSRP); a Sounding Reference Signal received Quality (SRSRQ), a carrier frequency of the candidate base station 101a and an uplink time-alignment of the UE 102a with respect to the candidate base station 101a.

Based on the received second parameter from the candidate base station 101a, the serving base station 100 computes an equivalent Reference Signal Received Power (RSRP) and/or an equivalent Reference Signal Received Quality (RSRQ). The second parameter includes the SRSRP and/or SRSRQ. Further, the serving base station 100 determines whether the equivalent RSRP and/or equivalent RSRQ meets the handover criteria. In an embodiment, the handover criteria includes but are not limited to a network load, RSRP of the serving base station 100, and Quality of Service (QoS) of the UE 102a.

The serving base station 100 initiates a UE handover procedure to the candidate base station 101a after determining that the second parameter meets the handover criteria. In an embodiment, the handover procedure includes information related to uplink timing advance of the candidate base station 101a and dedicated uplink resources of the candidate base station 101a to transmit control and/or data.

In an embodiment, the serving base station 100 sends a handover command to the UE 102a. After receiving the handover command from the serving base station 100, UE will perform a Radio Resource Control (RRC) Connection Request procedure to connect to the candidate base station 101a.

FIG. 2 illustrates an overview of a homogenous network, according to embodiments as disclosed herein. The homogeneous network shown in FIG. 2 includes a serving base station 100, a plurality of candidate base stations 101a and 101b. The UE 102a is currently being served by the serving base station 100 and the UE 102a is within the radio coverage of the serving base station 100. Further, UE's 102b, UE 102c are within the radio coverage of the candidate base station 101a and UE's 102d, UE 102e and UE 102f are within the radio coverage of the candidate base station 101b. As depicted from the FIG. 2, the UE 102a is in connected mode and currently being served by the serving base station 100. In the connected mode, the UE 102a enters the radio coverage of the candidate base station 101a. The serving base station 100 after identifying that the UE 102a is entering the radio coverage of the candidate base station 101a and leaving the radio coverage of the serving base station 100, determines to handover UE 102a to the candidate base station 101a. Further, the serving base station 100 decides to trigger handover of UE 102a to attain load balancing, to support higher data rates, to achieve mobility robustness and so on.

In an embodiment, the serving base station 100 select the UE 102a to trigger handover procedure with the candidate base station 101a is based on one of Radio capabilities of the UE 102a, QoS requirements, reported RSRP for the serving base station 100, and Geo-location of the UE 102a.

In an embodiment, the serving base station 100 can be a macro base station and the candidate base station 101a, 101b are neighboring macro base stations to the serving base station 100. Unlike heterogeneous networks, each candidate base station 101a and 101b have their own radio coverage and not included within the radio coverage of the serving base station 100.

Although it is shown in the FIG. 1, that there is only one UE 102a currently served by the serving base station 100, it is to be understood to a person of ordinary skill in the art that any number of UEs are served by the serving base station 100.

The serving base station 100 shares configuration parameters of the UE 102a with the candidate base station 101a. In an embodiment, the configuration parameters includes but are not limited to the SRS transmission sequence identifier assigned to the UE 102a by the serving base station 100, a transmission schedule of the SRS transmission, a periodicity of the SRS transmission, a SRS transmit power of the UE 102a, the DMRS, and the PRACH.

In an embodiment, the candidate base station 101a obtains information derived from an uplink transmission of the UE 102a to detect whether the UE 102a is within the radio coverage of the candidate base station 101a. The information includes the first configuration parameter shared by the serving base station 100.

In an embodiment, the candidate base station 101a computes a second parameter associated with the candidate base station 101a and reports the second parameter after detecting that the UE 102a is within radio coverage of the candidate base station 101a.

In an embodiment, the candidate base station 101a determines whether the computed second parameter is within a threshold and reports the computed second parameter associated with the candidate base station 101a to the serving base station 100 after determining that the second parameter is within the threshold. This reduces message exchange on an interface between the serving base station 100 and the candidate base station 101a.

In an embodiment, the second parameter includes but is not limited to the SRSRP, the SRSRQ, a carrier frequency of the candidate base station 101a and the uplink time-alignment of the UE 102a with respect to the candidate base station 101a.

Based on the received second parameter from the candidate base station 101a, the serving base station 100 computes the equivalent RSRP and/or the equivalent RSRQ. The serving base station 100 computes equivalent RSRP and/or equivalent RSRQ because serving base station 100 uplink carrier could be different from the candidate base station 101a downlink carrier. The path loss on the candidate base station 101a downlink carrier has to be accounted while calculating the RSRP from the candidate base station 101a.

The second parameter includes the SRSRP and/or SRSRQ. Further, the serving base station 100 determines whether the equivalent RSRP and/or equivalent RSRQ meets the handover criteria. In an embodiment, the handover criteria includes but are not limited to a network load, RSRP of the serving base station 100, and the QoS of the UE 102a.

The serving base station 100 initiates a UE handover procedure to the candidate base station 101a after determining that the second parameter meets the handover criteria. In an embodiment, the handover procedure includes information related to uplink timing advance of the candidate base station 101a and dedicated uplink resources of the candidate base station 101a to transmit control and/or data.

In an embodiment, the serving base station 100 sends a handover command to the UE 102a. After receiving the handover command from the serving base station 100, UE will perform the RRC Connection Request procedure to connect to the candidate base station 101a.

The proposed method and system is applicable to both heterogeneous networks and homogeneous networks.

The proposed uplink transmission based discovery of UE can also be used for power management at the candidate base station 101a. When there are no UEs within the radio coverage of the candidate base station 101a, it can suspend the transmission of all control channels. The only activity at the candidate base station 101a in this case will be listening to SRS transmissions from the UE 102a served by the serving base station 100, either proactively or based on information provided by the serving base station 100. Once the candidate base station detects the UE 102a in its radio coverage, the transmission of control channels can be resumed. Another possibility is that after the candidate base station 101a has reported the presence of a UE 102a in its radio coverage, the serving base station determines whether the candidate base station 101a needs to transmit control channels.

FIG. 3 illustrates a block diagram of a serving base station, a User Equipment (UE), and candidate base station, according to embodiments as disclosed herein. A communication network 300 may include the serving base station 100 and the UE 102a and the candidate base station 101a. The serving base station 100 may include a communication interface module 301, a processing module 302, and a set of program code instructions stored in a non-transitory storage module 303 and executable by the processing module 302. The UE 102a and the candidate base station 101a may include a communication interface module 304, a processing module 305, and a set of program code instructions stored in a non-transitory storage module 306 and executable by the processing module 305. The communication interface module 301 in the serving base station 100 may be configured to engage in communication with the communication interface module 304 in UE 102a and the candidate base station 101a through a communication path that includes a wireless link 307. The wireless link 307 may be a bi-directional link. The communication interface module 304 in the UE 102a and the candidate base station 101a may also be configured to engage in a communication with the communication interface module 301 in the serving base station 100. The serving base station 100 and the UE 102a, the candidate base station 101a may be configured to send and receive data over wireless link 307 using multiple frequency carriers. According to some of the various aspects of embodiments, transceiver(s) may be employed. A transceiver is a device that includes both a transmitter and receiver. Transceivers may be employed in the UE 102a, the serving base station 100, the candidate base station 101a, relay nodes, and the like.

FIG. 4 is a flow diagram explaining a method 400 of triggering a UE handover in a radio communication network. At step 401, the method 400 includes sharing a first configuration parameter associated with the UE with a plurality of candidate base stations by a serving base station. In an embodiment, the method 400 allows the communication interface module 301 in the serving base station 100 to share the first configuration parameter associated with the UE with the plurality of candidate base stations. The first configuration parameter include but are not limited to the SRS transmission sequence identifier assigned to the UE by the serving base station, a transmission schedule of the SRS transmission, a periodicity of the SRS transmission, a SRS transmit power of the UE, the DMRS, and the PRACH.

At step 402, the method 400 includes obtaining information derived from an uplink transmission of the UE. In an embodiment, the candidate base station obtains information derived from the uplink transmission of the UE to detect whether the UE is within the radio coverage of the candidate base station. The information includes the first configuration parameter shared by the serving base station.

At step 403, the method 400 includes reporting a second parameter associated with the candidate base station to the serving base station. In an embodiment, the second parameter include but are not limited to the SRSRP, the SRSRQ, a carrier frequency of the candidate base station and the uplink time-alignment of the UE with respect to the candidate base station. In an embodiment, the candidate base station computes the second parameter associated with the candidate base station and reports the second parameter after detecting that the UE is within radio coverage of the candidate base station.

In an embodiment, the candidate base station determines whether the computed second parameter is within a threshold and reports the computed second parameter associated with the candidate base station to the serving base station after determining that the second parameter is within the threshold. This reduces message exchange on the interface between the serving base station and the candidate base station.

At step 404, the method 400 includes computing the equivalent RSRP and/or the equivalent RSRQ based on the reported second parameter. Based on the received second parameter from the candidate base station, the serving base station computes the equivalent RSRP and/or the equivalent RSRQ. The serving base station computes equivalent RSRP and/or equivalent RSRQ because serving base station uplink carrier could be different from the candidate base station downlink carrier. The path loss on the candidate base station downlink carrier has to be accounted while calculating the RSRP from the candidate base station.

At step 405, the method 400 includes determining whether the equivalent RSRP and/or RSRQ meets handover criteria. In an embodiment, the serving base station determines whether the equivalent RSRP and/or equivalent RSRQ meets the handover criteria. In an embodiment, the handover criteria include but are not limited to a network load, RSRP of the serving base station, and the QoS of the UE.

If it is determined at step 405 that the equivalent RSRP and/or the equivalent RSRQ does not meet the handover criteria, then at step 406, method 400 includes terminating to trigger UE handover.

If it is determined at step 405 that the equivalent RSRP and/or the equivalent RSRQ meets the handover criteria, then at step 407, the method 400 includes initiating a handover procedure to the candidate base station. In an embodiment, the handover procedure includes information related to uplink timing advance of the candidate base station 101a and dedicated uplink resources of the candidate base station 101a to transmit control and/or data.

In an embodiment, the serving base station sends a handover command to the UE. After receiving the handover command from the serving base station, UE performs the RRC Connection Request procedure to connect to the candidate base station.

The various actions, acts, blocks, steps, and the like in method 400 may be performed in the order presented, in a different order or simultaneously. Further, in some embodiments, some actions, acts, blocks, steps, and the like may be omitted, added, modified, skipped, and the like without departing from the scope of the Embodiment.

FIG. 5 is a sequence diagram showing the steps involved in UE handover to a candidate base station, according to embodiments as disclosed herein. FIG. 5 shows the UE 102a, the serving base station 100 and the candidate base station 101a. The UE 102a is currently served by the serving base station 100. The UE 102a sends (501) an uplink transmission information to the serving base station 100. The uplink transmission information include but are not limited to the SRS transmission sequence identifier assigned to the UE by the serving base station, a transmission schedule of the SRS transmission, a periodicity of the SRS transmission, a SRS transmit power of the UE, the DMRS, and the PRACH. The serving base station 100 shares (502) uplink transmission information of UE 102a to the candidate base station 101a. The candidate base station 101a after receiving the uplink transmission information of the UE 102a from the serving base station 100, detects (503) the UE 102a in its radio coverage.

The candidate base station 101a computes a second parameter associated with the candidate base station 101a and reports (504) the second parameter to the serving base station 100 after detecting that the UE 102a is within radio coverage of the candidate base station 101a.

In an embodiment, the candidate base station 101a determines whether the computed second parameter is within a threshold and then reports the computed second parameter associated with the candidate base station 101a to the serving base station 100 after determining that the second parameter is within the threshold. This reduces message exchange on an interface between the serving base station 100 and the candidate base station 101a.

In an embodiment, the second parameter includes but is not limited to the SRSRP, the SRSRQ, a carrier frequency of the candidate base station 101a and the uplink time-alignment of the UE 102a with respect to the candidate base station 101a.

Based on the received second parameter from the candidate base station 101a, the serving base station 100 computes (505) the equivalent RSRP and/or the equivalent RSRQ.

The second parameter includes the SRSRP and/or SRSRQ. Further, the serving base station 100 determines whether the equivalent RSRP and/or equivalent RSRQ meets the handover criteria. In an embodiment, the handover criteria includes but are not limited to a network load, RSRP of the serving base station 100, and the QoS of the UE 102a.

The serving base station 100 initiates a UE handover procedure to the candidate base station 101a after determining that the second parameter meets the handover criteria. In an embodiment, the handover procedure includes information related to uplink timing advance of the candidate base station 101a and dedicated uplink resources of the candidate base station 101a to transmit control and/or data.

In an embodiment, the serving base station 100 sends (506) a handover command to the UE 102a. After receiving the handover command from the serving base station 100, UE performs (507) the RRC Connection Request procedure to connect to the candidate base station 101a.

The embodiments disclosed herein can be implemented through at least one software program running on at least one hardware device and performing network management functions to control the elements. The elements shown in FIGS. 1, 2 3 and 5 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for triggering a User Equipment (UE) handover in a radio communication network comprising at least one serving base station and a plurality of candidate base stations, the method comprising:

sharing a first configuration parameter associated with said UE with said plurality of candidate base stations by said at least one serving base station, wherein said UE is associated with said serving base station, wherein said first configuration parameter comprises one of:
at least one of a Sounding Reference Signal (SRS) transmission sequence identifier assigned to said UE by said serving base station, a transmission schedule of said SRS transmission, a periodicity of said SRS transmission, and a SRS transmit power of said UE, and
one of a reference signal, a Demodulation Reference Signal (DMRS), and a Physical Random Access Channel (PRACH);

obtaining information derived from an uplink transmission of said UE by a candidate base station from said plurality of candidate base stations to detect whether said UE is within its radio coverage, wherein said information is obtained using one of: proactively by said candidate base station and from said serving base station without said serving base station requesting for said information from said UE, wherein said information comprises at least one of said first configuration parameter and a second parameter;

reporting said second parameter associated with said candidate base station by said candidate base station to said serving base station in response to detecting that said UE is within radio coverage of said candidate base station, wherein said second parameter includes an uplink time-alignment of said UE with respect to said candidate base station, wherein said serving base station determines a need to transmit control signals, by said candidate base station to said UE, after said candidate base station reports a presence of said UE within radio coverage of said candidate base station; and determining, at said serving base station, whether said second parameter meets a handover criteria to trigger said UE handover to said candidate base station based on one of capabilities of said UE, and Geo-location of said UE.

2. The method of claim 1, wherein reporting said second parameter associated with said candidate base station to said serving base station in response to detecting that said UE is within radio coverage of said candidate base station comprises:
computing said second parameter associated with said candidate base station; and
reporting said computed second parameter to said serving base station in response to detecting that said UE is within radio coverage of said candidate base station.

3. The method of claim 2, wherein reporting said computed second parameter comprises:
determining whether said computed second parameter is within a threshold; and
reporting said computed second parameter associated with said candidate base station to said serving base station in response to determining that said second parameter is within said threshold.

4. The method of claim 1, wherein said candidate base station uses said first configuration parameter to detect said UE served by said serving base station.

5. The method of claim 1, wherein said second parameter comprises at least one of a Sounding Reference Signal received power (SRSRP), a Sounding Reference Signal received Quality (SRSRQ), and a carrier frequency of said candidate base station.

6. The method of claim 1, wherein determining, at said serving base station, whether said second parameter meets a handover criteria to trigger said UE handover to said candidate base station comprises:
computing at least one of an equivalent Reference Signal Received Power (RSRP) and an equivalent Reference Signal Received Quality (RSRQ) based on said reported second parameter, wherein said second parameter comprises said at least one of said SRSRP and SRSRQ; and
determining whether said at least one of equivalent RSRP and equivalent RSRQ meets said handover criteria, wherein said handover criteria comprises at least one of a network load, a serving base station RSRP, and Quality of Service (QoS) of said UE.

7. The method of claim 1, wherein said method further comprises initiating a handover procedure for said UE to said candidate base station in response to determining that said second parameter meets said handover criteria, wherein said handover procedure comprises information related to uplink timing advance of said candidate base station and dedicated uplink resources of said candidate base station to transmit at least one of control and data.

8. A system for triggering a User Equipment (UE) handover in a radio communication network comprising at least one serving base station and a plurality of candidate base stations, the system is configured to:
   share a first configuration parameter associated with said UE with said plurality of candidate base stations by said at least one serving base station, wherein said UE is associated with said serving base station, wherein said first configuration parameter comprises one of:
      at least one of a Sounding Reference Signal (SRS) transmission sequence identifier assigned to said UE by said serving base station, a transmission schedule of said SRS transmission, a periodicity of said SRS transmission, and a SRS transmit power of said UE, and
      one of a reference signal, a Demodulation Reference Signal (DMRS), and a Physical Random Access Channel (PRACH);
   obtain information derived from an uplink transmission of said UE by a candidate base station from said plurality of candidate base stations to detect whether said UE is within its radio coverage, wherein said information is obtained using one of: proactively by said candidate base station and from said serving base station without said serving base station requesting for said information from said UE, wherein said information comprises at least one of said first configuration parameter and a second parameter;
   report said second parameter associated with said candidate base station by said candidate base station to said serving base station in response to detecting that said UE is within radio coverage of said candidate base station, wherein said second parameter includes an uplink time-alignment of said UE with respect to said candidate base station, wherein said serving base station determines a need to transmit control signals by said candidate base station to said UE after said candidate base station reports a presence of said UE within radio coverage of said candidate base station; and
   determine, at said serving base station, whether said second parameter meets a handover criteria to trigger said UE handover to said candidate base station based on one of capabilities of said UE, and Geo-location of said UE.

9. The system of claim 8, wherein said candidate base station is configured to report a second parameter associated with said candidate base station to said serving base station in response to detecting that said UE is within radio coverage of said candidate base station comprises:
   computing said second parameter associated with said candidate base station; and
   reporting said computed second parameter to said serving base station in response to
   detecting that said UE is within radio coverage of said candidate base station.

10. The system of claim 9, wherein said candidate base station is configured to report a second parameter associated with said candidate base station to said serving base station in response to detecting that said UE is within radio coverage of said candidate base station comprises:
   determining whether said computed second parameter is within a threshold; and
   reporting said computed second parameter associated with said candidate base station to said serving base station in response to determining said second parameter is within said threshold.

11. The system of claim 8, wherein said candidate base station uses said first configuration parameter to detect said UE served by said serving base station.

12. The system of claim 8, wherein said second parameter comprises at least one of a Sounding Reference Signal received power (SRSRP), a Sounding Reference Signal Received Quality (SRSRQ), and a carrier frequency of said candidate base station.

13. The system of claim 8, wherein said serving base station is configured to determine whether said second parameter meets a handover criteria to trigger said UE handover to said candidate base station comprises:
   computing at least one of an equivalent Reference Signal Received Power (RSRP) and an equivalent Reference Signal Received Quality (RSRQ) based on said reported second parameter also equivalent SRSRQ, wherein said second parameter comprises at least one of said SRSRP and SRSRQ; and
   determining whether said at least one of equivalent RSRP and said equivalent RSRQ meets said handover criteria, wherein said handover criteria comprises at least one of a network load, a serving base station RSRP, and Quality of Service (QoS) of said UE.

14. The system of claim 8, wherein said serving base station is further configured to initiate a handover procedure for said UE to said candidate base station in response to determining that said second parameter meets said handover criteria, wherein said handover procedure comprises information related to uplink timing advance of said candidate base station and dedicated uplink resources to transmit at least one of control and data.

15. A serving base station to trigger a User Equipment (UE) handover in a radio communication network including a plurality of candidate base stations, wherein said serving base station is configured to:
   share information related to an uplink transmission of said UE with said plurality of candidate base stations, wherein said information is obtained from said UE without transmitting a request, wherein said UE is served by said serving base station, wherein said information is associated with a first configuration parameter wherein said first configuration parameter comprises one of:
      at least one of a Sounding Reference Signal (SRS) transmission sequence identifier assigned to said UE by said serving base station, a transmission schedule of said SRS transmission, a periodicity of said SRS transmission, and a SRS transmit power of said UE, and
      one of a reference signal, a Demodulation Reference Signal (DMRS), and a Physical Random Access Channel (PRACH);
   receive a second parameter associated with a candidate base station after detecting that said UE is within radio coverage of said candidate base station, wherein said second parameter includes an uplink time-alignment of said UE with respect to said candidate base station, wherein said serving base station determines need to transmit control signals by said candidate base station to said UE after said candidate base station reports presence of said UE within radio coverage of said candidate base station; and
   determine whether said second parameter meets handover criteria to trigger said UE handover to said candidate base station based on one of capabilities of said UE, and Geo-location of said UE.

16. The serving base station of claim 15, wherein said serving base station is configured to determine whether said second parameter meets a handover criteria to trigger said UE handover to said candidate base station comprises:
determining whether said second parameter is within a threshold.

17. The serving base station of claim 15, wherein said candidate base station uses said first configuration parameter to detect said UE served by said serving base station.

18. The serving base station of claim 15, wherein said second parameter comprises at least one of a Sounding Reference Signal received power (SRSRP), a Sounding Reference Signal received Quality (SRSRQ), and a carrier frequency of said candidate base station.

19. The serving base station of claim 15, wherein said serving base station is configured to determine whether said second parameter meets a handover criteria to trigger said UE handover to said candidate base station comprises:

computing at least one of an equivalent Reference Signal Received Power (RSRP) and an equivalent Reference Signal Reference Quality (RSRQ) based on said reported second parameter, wherein said second parameter comprises said at least one of SRSRP and said SRSRQ; and
determining whether said at least one of said equivalent RSRP and said equivalent RSRQ meets said handover criteria, wherein said handover criteria comprises at least one of a network load, a serving base station RSRP, and Quality of Service (QoS) of said UE.

20. The serving base station of claim 15, wherein said serving base station is further configured to initiate a handover procedure for said UE to said candidate base station in response to determining that said second parameter meets said handover criteria, wherein said handover procedure comprises information related to uplink timing advance of said candidate base station and dedicated uplink resources of said candidate base station to transmit at least one of control and data.

* * * * *